United States Patent
Kamal et al.

(10) Patent No.: US 10,853,914 B2
(45) Date of Patent: Dec. 1, 2020

(54) METHODS AND SYSTEMS FOR AUTOMATIC IMAGE STITCHING FAILURE RECOVERY

(71) Applicant: Verizon Patent and Licensing Inc., Arlington, VA (US)

(72) Inventors: Syed Meeran Kamal, Raritan, NJ (US); Mohamed Elshorbagy, Bethlehem, PA (US); Lama Hewage Ravi Prathapa Chandrasiri, Franklin Park, NJ (US); Anbazhagan Palani, Somerset, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 119 days.

(21) Appl. No.: 16/283,362

(22) Filed: Feb. 22, 2019

(65) Prior Publication Data

US 2020/0273147 A1 Aug. 27, 2020

(51) Int. Cl.
*G06T 3/40* (2006.01)
*G06T 7/00* (2017.01)
*G06K 9/03* (2006.01)

(52) U.S. Cl.
CPC ............ *G06T 3/4038* (2013.01); *G06K 9/036* (2013.01); *G06T 7/0002* (2013.01); *G06T 2207/30168* (2013.01)

(58) Field of Classification Search
CPC .................. G06T 3/4038; G06T 7/0002; G06T 2207/30168; G06K 9/036
See application file for complete search history.

(56) References Cited

U.S. PATENT DOCUMENTS

| 2008/0106593 A1* | 5/2008 | Arfvidsson | G06T 3/0062 348/39 |
| 2019/0318453 A1* | 10/2019 | Jung | G06T 3/4038 |
| 2020/0020075 A1* | 1/2020 | Khwaja | G06T 5/002 |

OTHER PUBLICATIONS

Meng, X., Wang, W. and Leong, B., Oct. 2015. Skystitch: A cooperative multi-uav-based real-time video surveillance system with stitching. In Proceedings of the 23rd ACM international conference on Multimedia (pp. 261-270).*

* cited by examiner

*Primary Examiner* — Zhitong Chen

(57) ABSTRACT

An exemplary image stitching recovery system detects a failed attempt by an image stitching system to generate a first panoramic image in a target location image set that includes a plurality of panoramic images each depicting a target location from a different respective locus point. The image stitching recovery system identifies a particular locus point at which a second panoramic image within the target location image set has been successfully generated, and identifies, based on a second set of control points that were used by the image stitching system to successfully generate the second panoramic image at the particular locus point, a first set of control points based upon which the first panoramic image is to be successfully generated. Subsequently, the image stitching recovery system directs the image stitching system to generate, based on the first set of control points, the first panoramic image in the target location image set.

20 Claims, 10 Drawing Sheets

US 10,853,914 B2

METHODS AND SYSTEMS FOR AUTOMATIC IMAGE STITCHING FAILURE RECOVERY

BACKGROUND INFORMATION

In various scenarios and/or for various purposes, it may be desirable for a person to virtually visit, tour, explore, walk through, or otherwise experience a target location such as a data center, an office building, a mall, real estate offered for sale or rent, or the like. A set of such panoramic images from different locus points in and around a target location may form a target location image set, and may be used to provide, to a viewer at a remote location (e.g., a location remote from the target location), access to view, explore, and otherwise virtually experience the target location.

For example, the viewer may move from panoramic image to panoramic image to thereby virtually walk through and explore the target location. Additionally, in cases where panoramic images are full 360° or spherical images, the viewer may, from the perspective of any particular locus point, view the corresponding panoramic image in a manner that replicates looking around the locus point in various directions (e.g., forward, backward, left, right, up, down, etc.). In some examples, other operations such as zooming in on an image, interacting with an image (e.g., selecting hyperlinks, etc.), and/or other suitable operations may further enhance the viewer's experience of the target location. Misaligned images from different locus points around a target may interfere with the user's ability to view or explore the target location.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
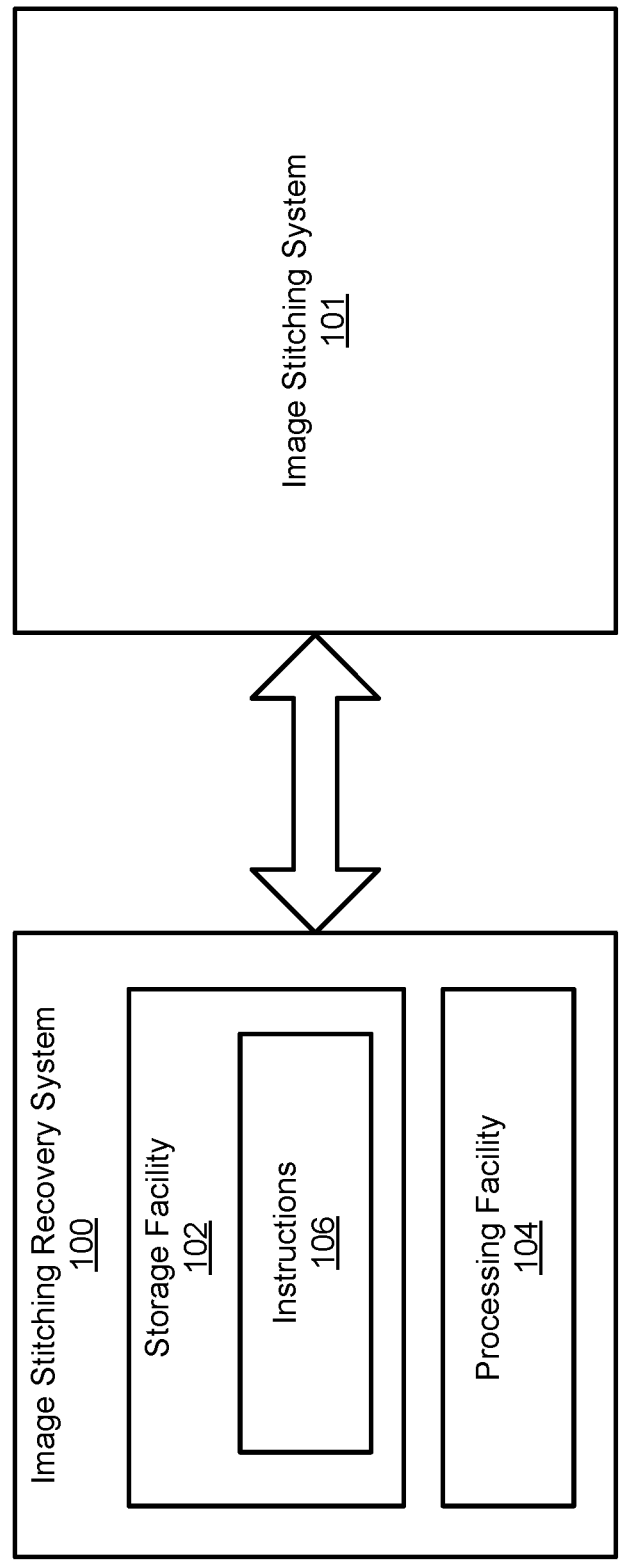
FIG. 1 illustrates an exemplary image stitching recovery system for automatic image stitching failure recovery, along with an associated image stitching system according to principles described herein.

Methods and systems for automatic image stitching failure recovery are described herein. More particularly, the methods and systems described herein provide fully-automatic and/or user-assisted ways of repairing or otherwise recovering from image stitching failures using the same original image segments that an image stitching system failed to stitch together on a first attempt. For example, as will be described in more detail below, an image stitching system may fail to successfully stitch several image segments (e.g., individual photographs, video frames, or the like) to one another if the image segments lack sufficient features for the image stitching system to properly identify where stitching is to be performed. Even for such featureless or feature-sparse image segments, however, systems and methods described herein may facilitate the successful generation of properly stitched panoramic images in various ways described in more detail below.

For example, one embodiment of an image stitching recovery system associated with an image stitching system may detect a failed attempt by the image stitching system to generate a first panoramic image in a target location image set. The target location image set, as mentioned above, may include a plurality of panoramic images each depicting a target location from a different respective locus point at the target location. As such, this image stitching recovery system may identify, in response to the detecting of the image stitching failure, a particular locus point at which a second panoramic image within the target location image set has been successfully generated. The image stitching recovery system may also identify a first set of control points based upon which the first panoramic image is to be successfully generated. For instance, the image stitching recovery system may identify the first set of control points based on a second set of control points that were used by the image stitching system to successfully generate the second panoramic image at the particular locus point. Accordingly, based on this first set of control points, the image stitching recovery system may direct the image stitching system to generate the first panoramic image in the target location image set (e.g., to now successfully generate the first panoramic image or to at least reattempt to do so prior to alerting a user of a repeated failure that may require additional manual troubleshooting to be performed).

Implementations of an image stitching recovery system or method described herein may provide various advantages and benefits when associated with (e.g., integrated with, communicatively coupled with, etc.) an image stitching system configured to generate panoramic images in a target location image set. The problem of generating panoramic images for a target location image set has previously been approached in various ways, each of which is associated with certain disadvantages.

For example, one approach for generating panoramic images for a target location involves using a camera with a very wide-angle lens (e.g., a fisheye lens) such that a single captured image may cover a wide angle around a locus point (e.g., up to a full 360° angle in certain examples) and no stitching of multiple image segments needs to be performed. The problems with this approach, however, may be significant, particularly for applications where high quality (e.g., high resolution, low distortion, etc.) is prioritized. Specifically, such wide-angle capture devices may tend to significantly distort images they capture and provide a relatively low level of quality (e.g., low resolution, etc.).

The issues surrounding the use of extremely wide-angle capture devices may be resolved using panoramic images generated by stitching together a set of image segments (e.g., individual images captured at a high resolution but each only covering a limited field of view such as a field of view of approximately 90° to avoid significant distortion). Accordingly, another exemplary approach for generating panoramic images for a target location may be to mount a plurality of image segment capture devices onto a single fixture (e.g., four devices each configured to capture approximately 90° so as to capture, in total, the full 360° around the fixture). Calibration may be performed in such examples to determine extrinsic parameters defining the static relationship between the mounted capture devices and remove the need to identify a stitch line based on features depicted in the images. Unfortunately, this approach may be expensive and inconvenient to deploy in real world applications, and may result in inconsistent results. For example, it may be difficult or impossible to match and update various camera settings (e.g., focus settings, aperture settings, exposure settings, etc.) within each of the capture devices so as to provide a consistent quality in the panoramic images. Additionally, as the fixture is relocated from locus point to locus point within a target location so that synchronized images can be captured by each device, an operator responsible for moving the fixture may have to inconveniently travel relatively long distances to "hide" from the fixture so as to avoid being captured in a field of view that does not include a blind spot for the operator to hide in. This need to stay out of the field of view may render this approach extremely inconvenient to deploy, particularly when image sets for large target locations (e.g., target locations with hundreds or thousands of locus points) are being generated.

Accordingly, as will be described and illustrated in more detail below, it may be desirable to employ a stitching approach in which a single image capture device (e.g., an individual high-resolution camera) is rotated about each locus point to capture a plurality of different views of the target location from the locus point (e.g., four different views if the image capture device has a field of view of approximately 90° and the panoramic images are to be full 360° images). This approach may solve the problem identified above relating to inconsistent camera settings because the camera settings may be guaranteed to be the same for the capturing of each image segment. This approach may also solve the problem identified above relating to an operator having to hide because the operator will always be able to conveniently position himself or herself behind the image capture device when limited field of view images (e.g., 90° images) are captured. The challenge with this approach, however, is that, due to the non-static relationship of each camera position relative to the others, extrinsic parameters cannot be determined in a single calibration process and reliably used thereafter. As a result, each image segment captured may typically be analyzed individually to find features, identify control points, and determine stitch lines. As long as image segments tend to be rich in features, this individual analysis may work well, but when image segments lack features, it is common for attempts to stitch image segments together to fail as a result of unreliable control points. When an image stitching system that employs this approach is used to stitch panoramic images for hundreds or thousands of locus points at a target location and even a small percentage of these fail, dozens or hundreds of manhours of work to manually facilitate stitching may be required if failure recovery from the failed stitching attempts is not automatically performed.

Systems and methods described herein are configured to provide such automatic image stitching failure recovery. Specifically, as will be described and made apparent herein, systems and methods for automatic image stitching failure recovery may automatically identify revised control points for panoramic images that fail to stitch properly such that an image stitching system may automatically reattempt to perform stitching even for featureless or feature-sparse image segments.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary image stitching recovery system 100 ("recovery system 100") for automatic image stitching failure recovery, along with an associated image stitching system 101 ("stitching system 101"). As shown, recovery system 100 may include, without limitation, a storage facility 102 and a processing facility 104 selectively and communicatively coupled to one another. Facilities 102 and 104 may each include or be implemented by hardware and/or software components (e.g., processors, memories, communication interfaces, instructions stored in memory for execution by the processors, etc.). In some examples, facilities 102 and 104 may be distributed between multiple devices and/or multiple locations as may serve a particular implementation.

In some examples, stitching system 101 may be associated with recovery system 100 by being implemented on computing hardware that is separate from, but communicatively coupled with, recovery system 100. In such examples, stitching system 101 may include or be implemented by similar facilities to facilities 102 and 104. In other examples, stitching system 101 may be associated with recovery system 100 by being implemented on the same facilities (e.g., using the same processors, memories, disc storage, and other computing components) that implement recovery system 100. Regardless of the implementation details of recovery system 100 and stitching system 101 and the relationship between them, it will be understood that each of systems 100 and 101 may perform different types of operations and tasks and may thus be described herein as being separate systems. Each of facilities 102 and 104 within recovery system 100 will now be described in more detail.

Storage facility 102 may maintain (e.g., store) executable data used by processing facility 104 to perform any of the functionality described herein. For example, storage facility 102 may store instructions 106 that may be executed by processing facility 104. Instructions 106 may be executed by processing facility 104 to perform any of the functionality described herein, and may be implemented by any suitable application, software, code, and/or other executable data instance. Additionally, storage facility 102 may also maintain any other data received, generated, managed, used, and/or transmitted by processing facility 104 in a particular implementation.

Processing facility 104 may be configured to perform (e.g., execute instructions 106 stored in storage facility 102 to perform) various functions associated with automatic image stitching failure recovery. For example, processing facility 104 may be configured to detect a failed attempt by stitching system 101 to generate a first panoramic image in a target location image set (e.g., a target location image set that includes a plurality of panoramic images each depicting a target location from a different respective locus point at the target location). In response to the detecting of the image stitching failure, processing facility 104 may be configured to identify a particular locus point at which a second panoramic image within the target location image set has been successfully generated. Additionally, processing facility 104 may be configured to identify (e.g., select, generate, etc.) a first set of control points (also referred to herein as a "revised" set of control points) based upon which the first panoramic image is to be successfully generated. For example, processing facility 104 may identify the first set of control points based on a second set of control points that were used by stitching system 101 to successfully generate the second panoramic image at the particular locus point. Once the first set of control points has thus been selected, generated, or otherwise identified, recovery system 100 may direct stitching system 101 to generate, based on the first set of control points, the first panoramic image in the target location image set.

As mentioned above, recovery system 100 and stitching system 101 may operate together to generate a target location image set including a plurality of panoramic images each depicting a target location for a different respective locus point at the target location. For example, in certain implementations, recovery system 100 and stitching system 101 may be included within a panoramic image generation system configured to capture image segments at various locus points within the target location, stitch corresponding image segments together to generate respective panoramic images for each of the locus points, verify whether stitching is successful for each of the panoramic images, and, where stitching attempts fail, automatically recover from the stitching failures (e.g., so as to avoid requiring a human operator to intervene when possible).

Figure 2:
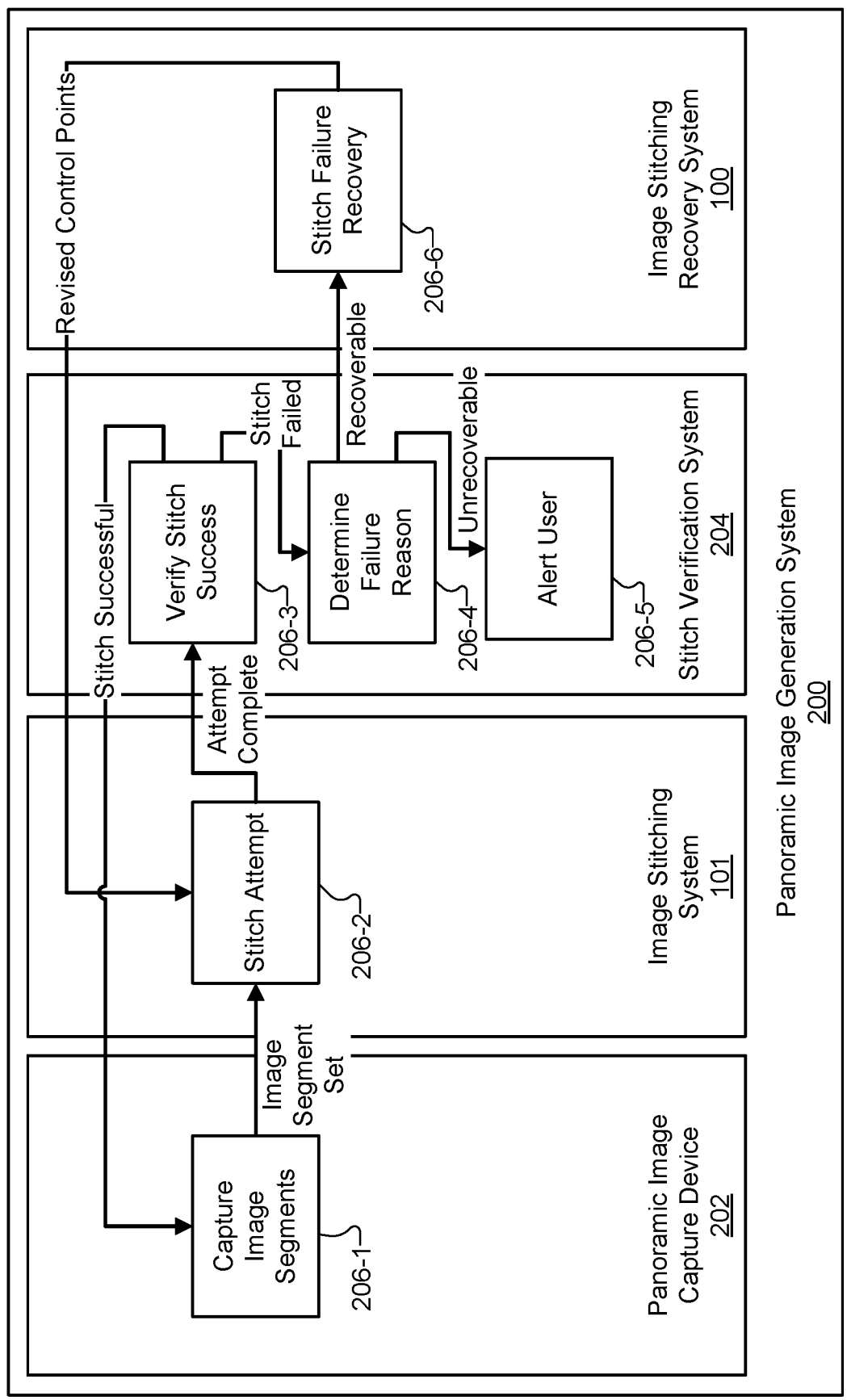
FIG. 2 illustrates an exemplary panoramic image generation system within which the image stitching recovery system and the image stitching system of FIG. 1 are configured to operate according to principles described herein.

FIG. 2 shows an exemplary panoramic image generation system 200 within which recovery system 100 and stitching system 101 are configured to operate and perform the functionality described above. Additionally, as shown, recovery system 100 and stitching system 101 may be configured to interoperate with other devices and systems such as a panoramic image capture device 202 ("capture device 202") and a stitch verification system 204 ("verification system 204").

Capture device 202 may be implemented by a device such as a camera or other suitable image capture device that is configured to be moved from locus point to locus point at a target location and to capture an image segment set at each locus point in a predefined way. For example, as will be described in more detail below, capture device 202 may be a camera attached to a special fixture that mounts the camera in a particular way and facilitates rotating the camera to a plurality of positions (e.g., four positions 90° apart, three positions 120° apart, six positions 60° apart, etc.).

In like manner as described above in relation to recovery system 100 and stitching system 101, verification system 204 may be implemented using computing components such as processors, memories, storage discs, and the like. For example, verification system 204 may be implemented on dedicated computing components that are communicatively coupled with recovery system 100 and/or stitching system 101 in certain implementations, or, in other implementations, may be integrated with recovery system 100 and/or stitching system 101 by being implemented as software executing using the same hardware as either or both of recovery system 100 and stitching system 101.

Along with depicting exemplary component parts of panoramic image generation system 200 such as capture device 202, stitching system 101, verification system 204, and recovery system 100, FIG. 2 also illustrates an exemplary process by way of which panoramic image generation system 200 generates a target location image set for a particular target location. Specifically, FIG. 2 illustrates a plurality of operations 206 (e.g., operations 206-1 through 206-6) that may be performed by different components of panoramic image generation system 200, as well as flow arrows interconnecting the operations to indicate the relationships between the operations and how and when each operation may be performed. Each of operations 206 and the flow arrows interconnecting them will now be described in more detail to provide an example of how panoramic image generation system 200 may generate a target location image set for a particular target location.

In operation 206-1, capture device 202 may be positioned at a particular locus point within the target location. For example, capture device 202 may be moved and controlled under the direction of an operator tasked with rotating capture device 202 from position to position at a given locus point and with moving capture device 202 from locus point to locus point. At any particular locus point, capture device 202 may be configured to capture image segments to form an image segment set. For instance, in implementations of capture device 202 configured to capture a full 360° field of view using four image segments of approximately 90° each, capture device 202 may capture the four image segments and provide an image segment set including the four image segments for the particular locus point to stitching system 101, as shown in FIG. 2.

Capture device 202 may provide the image segment set in any suitable way. For example, in certain implementations, capture device 202 may transmit (e.g., using a wired or wireless interface) data representative of the image segment set to stitching system 101 in real time or near real time as image segments are captured. In other implementations, capture device 202 may store all the image segments as capture device 202 is moved from locus point to locus point capturing the respective image segment sets. For example, capture device 202 may store the image segments on local storage of capture device 202 (e.g., on a flash memory card or the like), on network storage (e.g., cloud storage, etc.) hosted by a system to which capture device 202 is communicatively coupled, or on any other suitable storage facility. Then, at a later time (e.g., when the image segment capture process is complete), the captured image segments may be uploaded from capture device 202 to stitching system 101 in any suitable way (e.g., by wired or wireless transmission, by moving the memory card from capture device 202 to a card reader accessible to implementing stitching system 101, etc.).

In operation 206-2, stitching system 101 receives the image segment set from capture device 202 and makes an attempt to stitch the image segments in the image segment set together to form a panoramic image. Additional detail about how stitching system 101 attempts to stitch image segments together based on control points identified within the image segments will be described below. As will be described in more detail, a stitch attempt may be successful or may fail depending on various factors including the reliability of the control points used, which may be largely a function of how feature-rich the content depicted in the image segments happens to be. While stitching system 101 may consistently identify reliable control points for feature-rich image segments and thereby consistently generate successful panoramic images for those image segments, stitching system 101 may not always be able to identify such reliable control points for featureless or feature-sparse image segments. As such, attempts to generate panoramic images with certain image segments sets may fail. When operation 206-2 is complete and stitching of a panoramic image has been attempted, stitching system 101 may provide the resultant panoramic image data to verification system 204.

In operation 206-3, verification system 204 verifies whether operation 206-2 resulted in a successful or a failed stitch attempt. For example, verification system 204 may determine that the data resulting from operation 206-2 is a valid and correctly stitched panoramic image and, as a result, may indicate as much ("stitch successful") to capture device 202 or stitching system 101 to allow the next image segment set for the next locus point to be captured and/or to undergo the image stitching process. For instance, if capture device 202 transmits the image segments in real time as the image segments are captured, part of operation 206-3 may be to indicate to capture device 202 (e.g., by notifying an operator of capture device 202) that a panoramic image for the current locus point has been successfully generated and that capture device 202 may now be moved to the next locus point. In other examples (e.g., examples in which capture device 202 provides all of the image segments to stitching system 101 at one time after the image segments have been captured), part of operation 206-3 may be to indicate to stitching system 101 that a panoramic image for the current locus point has been successfully generated and that a stitch attempt for the next locus point may be performed.

Verification system 204 may perform operation 206-3 to confirm stitch success or detect stitch failure in any suitable way. For instance, in certain implementations, operation 206-3 may be performed by way of a stitch tool failure detection module, a stitched image analysis module, and/or a failure recovery selection module each included within verification system 204 (not explicitly shown in FIG. 2).

In such an implementation, the stitch tool failure detection module may be configured to directly monitor the output of image stitching system 101, which may provide verbal or other status output regarding whether the stitch attempt of operation 206-2 proceeded without incident. The stitch tool failure detection module may thus process this verbal and/or other status output to determine if the image stitching of operation 206-2 succeeded or failed for each particular locus point. If it is determined that the image stitching failed, the stitch tool failure detection module may be configured to send the failed image segment set for that particular locus point to the failure recovery selection module, while, if it is determined that the image stitching succeeded, the stitch tool failure detection module may be configured to send the failed image segment set to the stitched image analysis control module.

The failure recovery selection module may be configured to select image segments (e.g., from failed image segments sets received by the module) that can be used by recovery system 100 for operation 206-6, as will be described in more detail below. For example, the failure recovery selection module may identify the reasons that the stitch failed or resulted in an abnormal stitch. If a failure is detected, the failure recovery selection module may determine if the failure is due to capture error (e.g., a missing image segment in the image segment set, a lighting issue in one or more of the image segments in the image segment set, etc.) or is due to a failure to generate suitable and accurate control points. Additionally, if an ostensibly successful, but abnormal, stitch is detected, the failure recovery selection module similarly determines if the abnormality is due to capture issues or to challenges with generating suitable control points. In certain implementations, only if the failed or abnormal stitch is due to control point issues (e.g., an inability to detect or match features, etc.) does the failure recovery selection module pass the image segment set on to be recovered by recovery system 100.

The stitched image analysis module may be configured to analyze image segments that were allegedly stitched successfully (e.g., that were indicated to have been stitched successfully by stitching system 101) by subjecting the image segments to a series of tests. In this way, image segments that pass the tests may be marked for production use, while image segments that do not pass the tests (even though they were successfully stitched) may be sent to the failure recovery selection module. The series of tests performed by the stitched image analysis module may include various tests including, but not limited to, a test to determine whether there is greater than a threshold level of black in a panoramic image, a test to determine whether there is greater than a threshold level of white in the panoramic image, a test to determine whether the panoramic image aligned correctly (e.g., to avoid a potential upside-down camera configuration), a test to detect garbled image data within the panoramic image, a test to detect missing image data (e.g., a missing image segment) within the panoramic image, or the like.

For certain image segment sets, operation 206-3 may determine that the stitch attempt made in operation 206-2 fails. For example, as mentioned above, a stitch attempt may fail if the content depicted in the image segments is relatively devoid of feature based upon which reliable control points may be identified. In other examples, the stitch attempt may fail for other reasons such as that the image segments themselves are deficient in some way. For instance, an unwanted object may be in front of the lens of capture device 202 when an image segment is captured, an image segment may be captured with improper camera settings (e.g., so as to be underexposed or overexposed or the like), lighting around the locus point may be nonoptimal, or the like. Regardless of the reason, if verification system 204 determines in operation 206-3 that the stitch attempt has failed, the process flow may move from operation 206-3 to operation 206-4, as shown.

In operation 206-4, verification system 204 may attempt to determine why the stitch attempt failed and whether the failed stitch attempt is likely to be recoverable by recovery system 100, or, alternatively, whether a human user may need to be notified to help troubleshoot the failure. If the image segments are properly captured and the stitch attempt fails due to a lack of reliable control points, it is likely that recovery system 100 may be able to automatically facilitate stitch failure recovery so that panoramic image generation system 200 can successfully generate the panoramic image without relying on a human user's time. Conversely, if the stitch attempt fails as a result of problems with the image segments themselves, a human user may need to become involved to arrange for revised image segments to be captured or the like.

The determination of operation 206-4 may be made in any suitable way. For example, in certain implementations, stitch verification system 204 may analyze the image segments in the image segment set to automatically determine if the pictures were captured properly (e.g., not overexposed or underexposed, etc.) and without unexpected complications or issues such as nonoptimal lighting, an object blocking the capture device, or the like. If no such issues can be identified, operation 206-4 may determine that recovery system 100 is likely to be able to help recover the panoramic image without human intervention and the process flow may move to operation 206-6. Conversely, if operation 206-4 reveals that there are one or more issues with one or more of the image segments in the image segment set, operation 206-4 may determine that recovery system 100 is unlikely to be able to help recover the panoramic image without human intervention and the process flow may move to operation 206-5, where a human user (e.g., an operator of panoramic image generation system 200) may be alerted to the issue so that the human user can assist with troubleshooting the problem.

In the same or other implementations, operation 206-4 may make the determination of whether the failed stitch attempt is likely to be recoverable based on whether recovery has already been attempted (and/or based on how many times recovery has been attempted). For example, verification system 204 may detect that a particular failed attempt to generate a panoramic image represents an additional failed attempt that is based on a revised set of control points that has already been provided by recovery system 100 in accordance with functionality described in more detail below. As such, verification system 204 may determine that recovery system 100 has already attempted the stitch failure recovery and that the recovery attempt (or a particular number of recovery attempts greater than one) has also failed. In this case, verification system 204 may provide, in response to the detecting of the additional failed attempt, the alert of operation 206-5 that indicates to the human user that the additional failed attempt has occurred.

As mentioned above, the component parts of panoramic image generation system 200 shown in FIG. 2 (i.e., capture device 202 and systems 101, 204, and 100) may be combined, divided, and distributed in any suitable way. As such, it will be understood that certain operations described herein as being performed by one of these component parts in one example may instead by performed by other component parts (e.g., parts shown or not explicitly shown in FIG. 2) in other implementations. For example, in certain implementations, any or all of operations 206-3 through 206-5 described above to be performed by verification system 204 may be partially or fully performed by recovery system 100 and/or stitching system 101.

In operation 206-6, recovery system 100 may perform any of the operations described herein to attempt to revise and enhance control points that led to the failed stitch attempt such that stitching system 101 may reattempt the stitching and successfully generate the panoramic image. Additional detail regarding how recovery system 100 performs operation 206-6 will be described below, and, as shown in FIG. 2, operation 206-6 may result in revised control points that are provided to stitching system 101 along with instruction to reattempt the stitching using the same image segment set for which the stitching previously failed. More specifically, recovery system 100 may autonomously determine that each image segment of the image segment set used by stitching system 101 in the failed attempt to generate the panoramic image satisfies a predetermined image quality threshold (e.g., a quality threshold indicative that the image segments are not overexposed, underexposed, blocked by an unwanted object, illuminated with unsuitable lighting, etc.). Recovery system 100 may then direct stitching system 101 to generate the panoramic image by automatically directing (e.g., in response to the autonomous determining that each image segment of the image segment set satisfies the predetermined image quality threshold) stitching system 101 to reattempt operation 206-2 to generate the panoramic image based on the same image segment set previously provided by capture device 202 in operation 206-1 (i.e., the same image segment set used by stitching system 101 in the original failed attempt to generate the panoramic image).

Operation 206-6 may advantageously allow panoramic image generation system 200 to successfully generate panoramic images for image segment sets that include featureless or feature-sparse image segments automatically and without intervention by (or, in certain examples, even awareness of) a human user such as an operator of panoramic image generation system 200. Rather than having to spend significant amounts of time attempting to manually set revised control points and manually facilitate stitch failure recovery, the user may instead enjoy a higher success rate of automatic stitching attempts.

Figure 3:
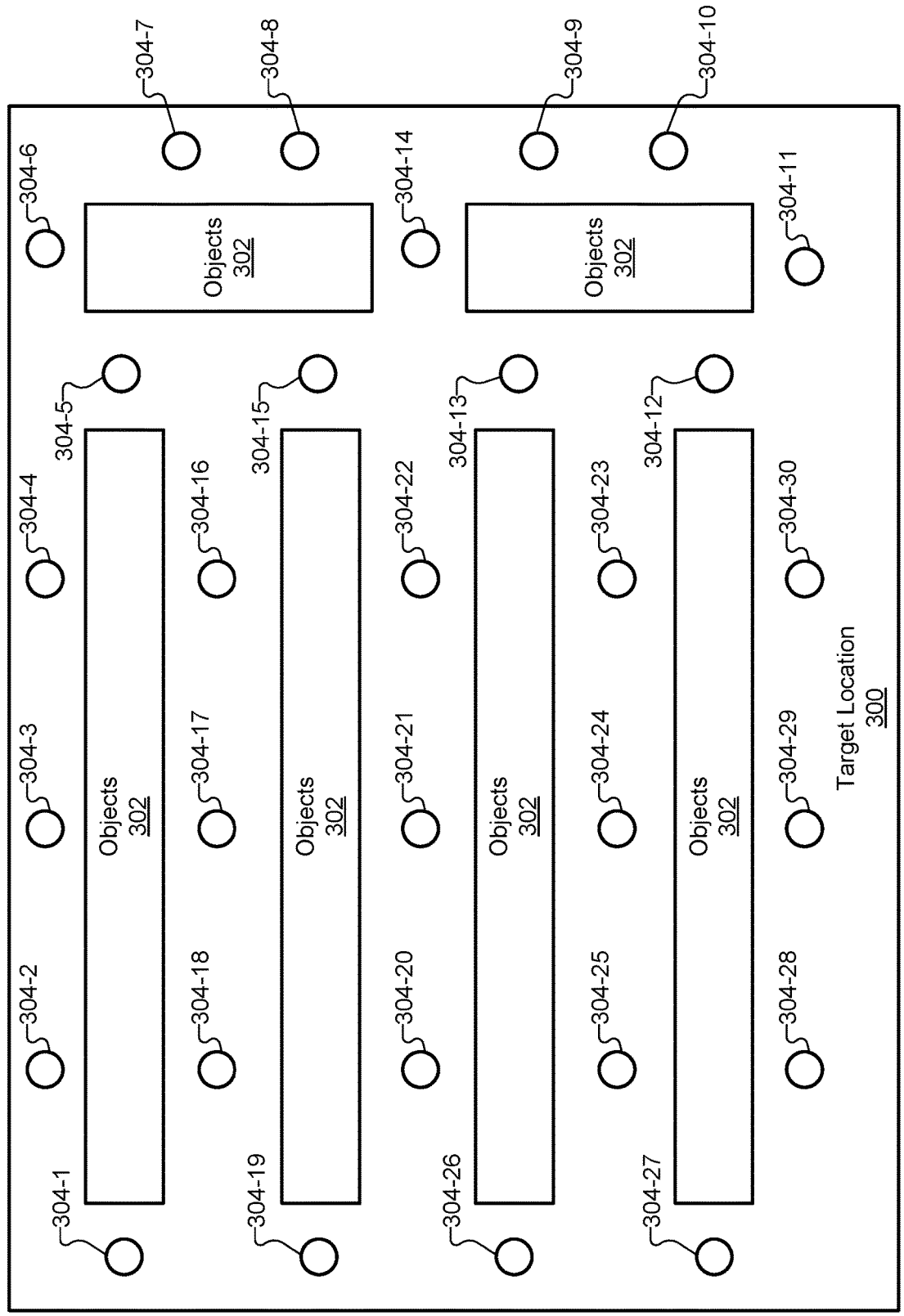
FIG. 3 illustrates a map view of an exemplary target location within which a plurality of exemplary locus points is depicted according to principles described herein.

As mentioned above, panoramic image generation system 200 may be employed to generate a target location image set that includes a plurality of panoramic images each depicting a target location from a different respective locus point at the target location. To illustrate, FIG. 3 illustrates a map view of an exemplary target location 300 within which a plurality of exemplary locus points is depicted. Specifically, as shown, various objects 302 (e.g., walls, objects lined up along the walls, etc.) may be included at target location 300, and a plurality of locus points 304 (e.g., locus points 304-1 through 304-30) may be strategically distributed along, around, within, between, and adjacent to objects 302 to allow a viewer of panoramic images captured at each locus point to explore and otherwise experience target location 300 and objects 302 therein.

The target location 300 for which panoramic image generation system 200 generates a target location image set may be any type of indoor or outdoor location that one or more users may wish to experience remotely using the target location image set for any reason. As one example, target location 300 may be a large data center including objects 302 implemented as rows of server computers. In this example, it may provide convenience, cost and time savings, and so forth if remote support personnel (e.g., information technology professionals, technicians, etc.) are enabled to troubleshoot issues and manage and maintain the servers in the data center by being able to virtually visit a certain location in the data center or to virtually walk through the data center. For instance, by virtually standing at a particular locus point 304, a technician may view which server is present at a location, what components are plugged into the server, what connections between components have been made or may need to be made, and so forth. In this way, technicians may more conveniently troubleshoot problems, train other personnel, and generally manage the data center.

As another example, target location 300 could be a particular floor of an office building that includes objects 302 implemented as rows of offices (e.g., cubicles, etc.), conference rooms, and so forth. In this example, visitors to the office, new employees, or others may be able to conveniently and successfully navigate the office building (e.g., without getting lost) by being able to virtually navigate and walk the halls of the building prior to arriving for meetings or a first day of work or the like.

It will be apparent that various other examples of target location 300 may also be served by the methods and systems described herein. In general, any location (e.g., and particularly any large location or any location with complex or detailed objects that need to be viewed) that a person may wish to view remotely may benefit from the generation of a target location image set in accordance with methods and systems described herein. For instance, other use cases besides those already described may include target locations such as commercial shopping centers (e.g., indoor or outdoor malls, car lots, etc.), airports, home or commercial real estate being offered for sale or rent, and various other examples as may serve a particular implementation.

To generate a target location image set representative of target location 300, panoramic image generation system 200 may be configured to generate a panoramic image from the perspective of each locus point 304 shown in target location 300. For example, an operator facilitating the operation of panoramic image generation system 200 may move capture device 202 from locus point 304 to locus point 304 (e.g., in the indicated order from locus point 304-1 to 304-30, or in another suitable order) and may facilitate the capture of a respective image segment set at each locus point 304 by, for example, rotating capture device 202 into each of a plurality of positions (e.g., four positions each 90° apart from one another in one example) to capture the image segments in the image segment set.

Figure 4:
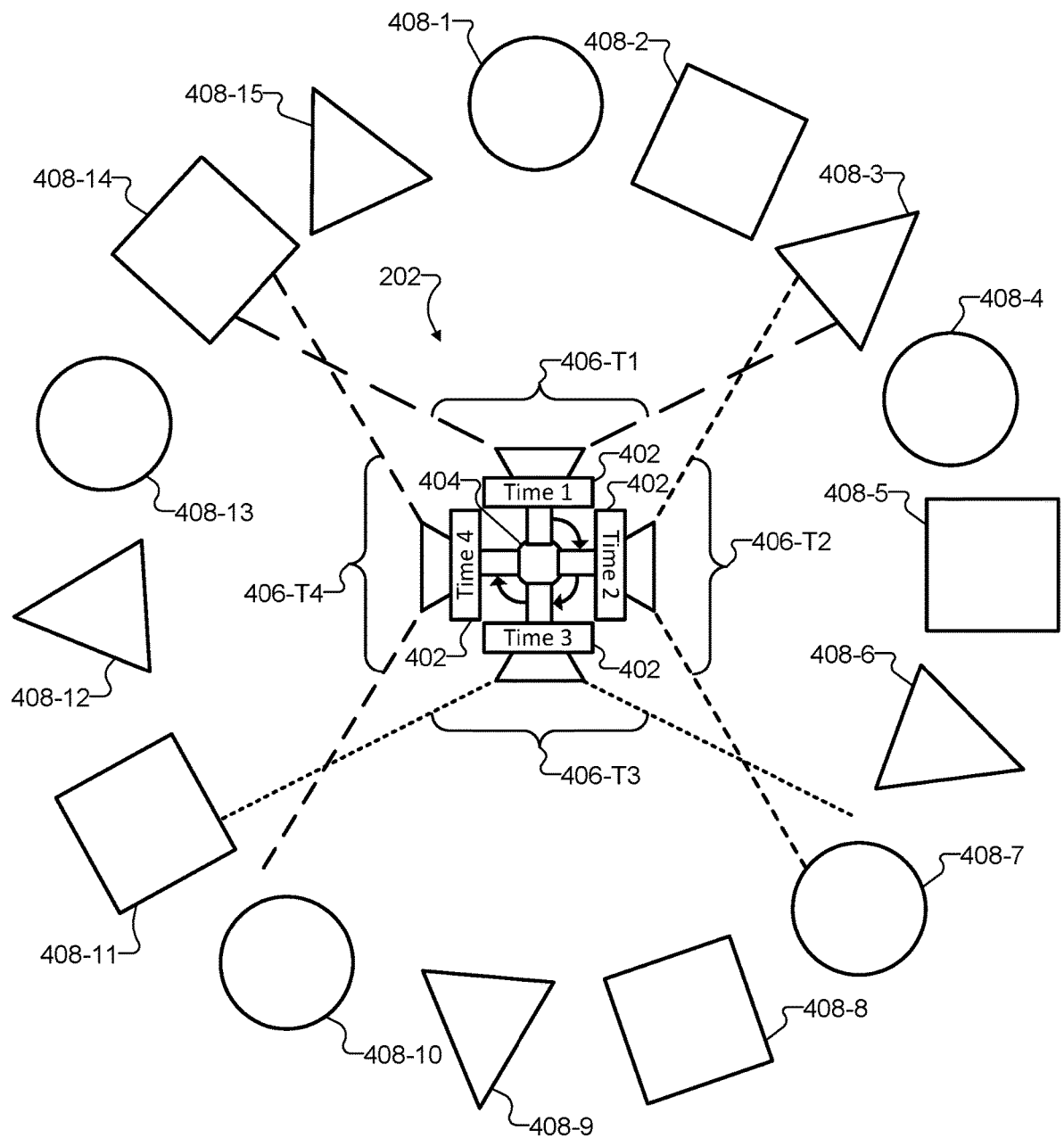
FIG. 4 illustrates an exemplary panoramic image capture device configured to capture image segments depicting a plurality of exemplary objects surrounding an exemplary locus point according to principles described herein.

To illustrate, FIG. 4 shows an exemplary implementation of capture device 202 that is positioned at a particular locus point 304 within target location 300 and is configured to capture an image segment set depicting objects surrounding the locus point. Specifically, as shown, capture device 202 is implemented by a camera 402, a fixture 404, and any other suitable components (e.g., communication interfaces such as a wireless network interface, mechanical features such as a wheeled cart, etc.) that may facilitate capture device 202 in performing the functionality described herein.

In FIG. 4, four copies of camera 402 are illustrated, each with a different label "Time 1" through "Time 4." Additionally, fixture 404 is depicted to include an arm extending from center portion to support camera 402 in four different positions indicated by arrows moving from one position to the next. Accordingly, it will be understood that capture device 202 may be positioned at a particular locus point 304 such that a sequence of image segments (e.g., four image segments in this example) may be captured at a sequence of four different times (e.g., a few seconds separated from one another) from each of the positions of fixture 404 shown. Because camera 402 has a field of view 406 slightly wider than 90°, the respective fields of view 406-T1 (i.e., field of view 406 at Time 1, in the first position) through 406-T4 (i.e., field of view 406 at Time 4, in the fourth position) are shown to cover a full 360° field of view around capture device 202 with some overlap between the fields of view 406 at each point in time.

While four positions for capture device 202 are shown in FIG. 4, it will be understood that, in other implementations, capture device 202 may be associated with another suitable number of positions. For instance, three positions each associated with slightly more than 120°, or six positions each associated with slightly more than 60° would each result in a similar overlapping 360° coverage as the coverage illustrated by the implementation of FIG. 4. In other examples, a panoramic image associated with fewer than 360° may be desired (e.g., if each locus point is along a wall that does not need to be captured or the like), and, as such, fewer positions or narrower fields of view may be appropriate (e.g., two positions of slightly more than 90° each, three positions of slightly more than 60° each, etc.). Additionally, while fields of view 406 are only shown to capture imagery along a two-dimensional ground plane, it will be understood that, in certain implementations, fixture 404 may be further configured to provide three dimensional positions such that, for example, one or more image segments facing up or down may be captured and a resultant panoramic image may be a fully spherical image rather than a cylindrically shaped panoramic image.

As described above, depictions of various types of objects that happen to surround a given locus point in a particular target location may be captured by capture device 202. For purposes of illustration, FIG. 4 thus depicts a plurality of different shape objects 408 (shape objects 408-1 through 408-15, which include circle objects, square objects, and triangle objects) that surround and are to be captured by capture device 202. While shape objects 408 are shown to be two-dimensional shapes laying flat as viewed from above in FIG. 4, it will be understood that each shape object 408 will be assumed to be captured as if standing up straight within one or more fields of view 406 for the image segment set captured by capture device 202.

Figure 5:
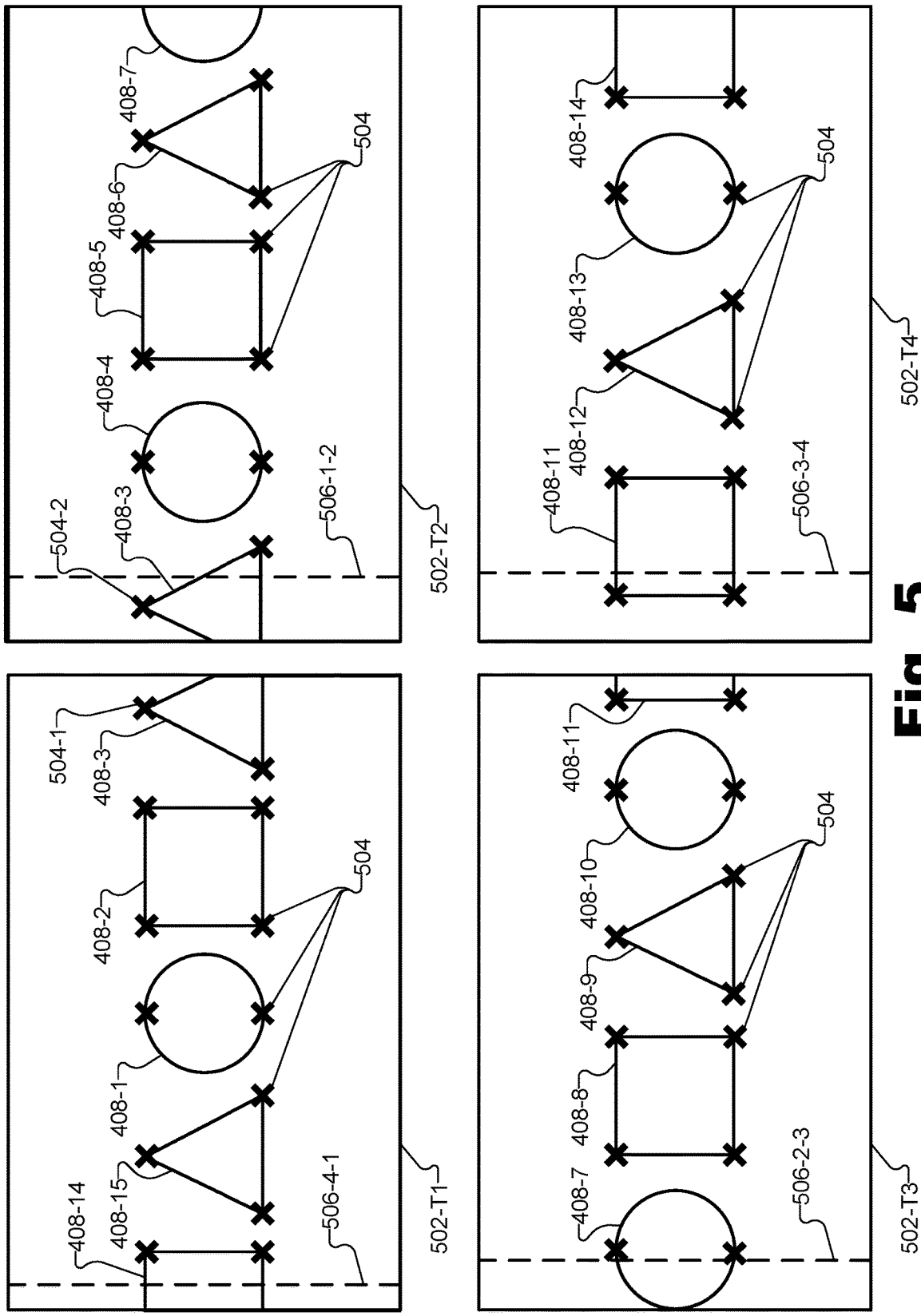
FIG. 5 illustrates an exemplary image segment set captured by the panoramic image capture device of FIG. 4 according to principles described herein.

To illustrate, FIG. 5 shows an exemplary image segment set 502 that is composed of four image segments labeled 502-T1 (the image segment captured by capture device 202 from the first position at Time 1) through 502-T4 (the image segment captured by capture device 202 from the fourth position at Time 4). As shown, each image segment 502-T1 through 502-T4 depicts various shape objects 408 (and/or portions thereof) in accordance with the respective fields of view 406 illustrated in FIG. 4. Specifically, for example, image segment 502-T1 depicts, in accordance with field of view 406-T1 in FIG. 4, a first portion of shape object 408-14, all of shape objects 408-15, 408-1, and 408-2, and a first portion of shape object 408-3. Image segment 502-T2 depicts, in accordance with field of view 406-T2 in FIG. 4, a second portion of shape object 408-3 (e.g., a portion that is different from but complementary to the first portion depicted in image segment 502-T1), all of shape objects 408-4, 408-5, and 408-6, and a first portion of shape object 408-7. Image segment 502-T3 depicts, in accordance with field of view 406-T3 in FIG. 4, all of shape objects 408-7 (including a second portion of shape object 408-7 that is complementary to the first portion depicted in image segment 502-T2), 408-8, 408-9, and 408-10, and a first portion of shape object 408-11. Image segment 502-T4 depicts, in accordance with field of view 406-T4 in FIG. 4, all of shape objects 408-11 (including a second portion of shape object 408-11 that is complementary to the first portion depicted in image segment 502-T3), 408-12, and 408-13, and a second portion of shape object 408-14 (e.g., a portion that is different from but complementary to the first portion depicted in image segment 502-T1).

In accordance with fields of view 406 in FIG. 4, image segments 502 overlap with one another to some degree and, collectively, depict all portions of all shape objects 408-1 through 408-15 in a full 360° angle around the locus point at which capture device 202 is located. Accordingly, a full 360° panoramic image may be generated and presented to a viewer by properly stitching together image segment set 502 (e.g., by stitching image segment 502-T1 to image segment 502-T2, stitching image segment 502-T2 to image segment 502-T3, stitching image segment 502-T3 to image segment 502-T4, and stitching image segment 502-T4 back to image segment 502-T1). Due to the overlap between image segments, stitch lines may not coincide with each edge of each image segment 502. Rather, as shown, a respective stitch line 506 (e.g., stitch line 506-4-1, 506-1-2, 506-2-3, or 506-3-4) corresponding to an edge of one image segment may correspond to a line near, but not at, the edge of another image segment. Specifically, as shown, stitch line 506-4-1 depicts a line where the edge of image segment 502-T4 is to be stitched to image segment 502-T1, stitch line 506-1-2 depicts a line where the edge of image segment 502-T1 is to be stitched to image segment 502-T2, stitch line 506-2-3 depicts a line where the edge of image segment 502-T2 is to be stitched to image segment 502-T3, and stitch line 506-3-4 depicts a line where the edge of image segment 502-T3 is to be stitched to image segment 502-T4.

Figure 6A:
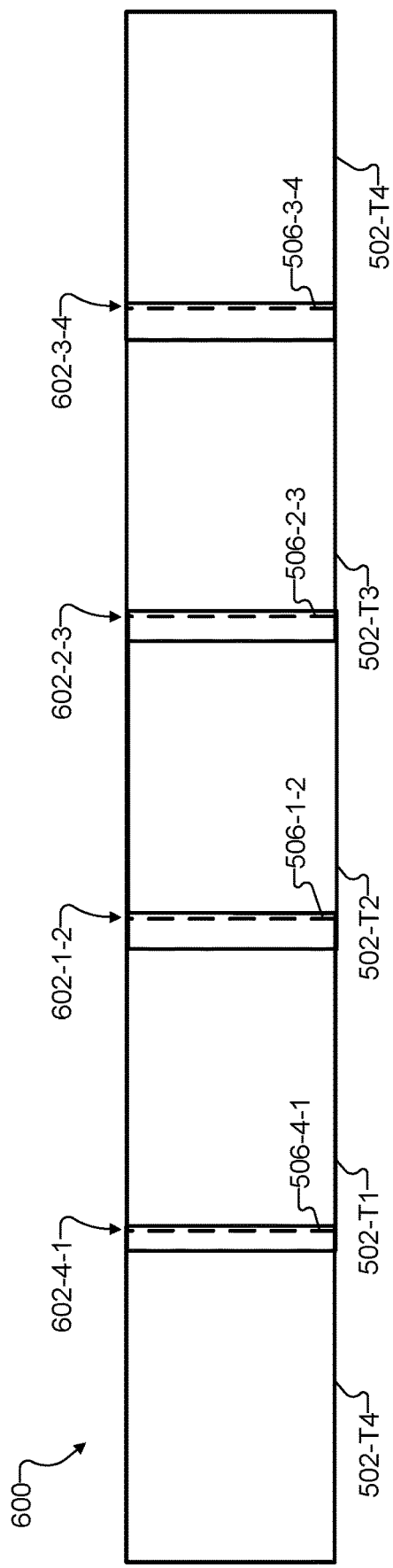
FIG. 6A illustrates a plurality of stitches performed by the image stitching system on the image segment set of FIG. 5 according to principles described herein.

Once stitch lines 506 have each been determined and defined, stitching system 101 may stitch image segments 502 to another by trimming off redundant imagery (e.g., imagery to the left of each stitch line 506), performing blending operations to obscure the stitch line 506, and storing the remaining imagery in a panoramic image format. To illustrate, FIG. 6A shows a plurality of stitches 602 (e.g., stitch 602-4-1 of image segment 502-T4 to image segment 502-T1, stitch 602-1-2 of image segment 502-T1 to image segment 502-T2, stitch 602-2-3 of image segment 502-T2 to image segment 502-T3, and stitch 602-3-4 of image segment 502-T3 to image segment 502-T4) performed by stitching system 101 on image segment set 502. Specifically, as shown, each edge of one image segment 502 is overlapped and aligned with a respective stitch line 506 of another image segment 502 so that redundant imagery may be blended, trimmed, or otherwise merged to thereby stitch the image segments together. It is noted that the edges and stitch lines depicted in FIG. 6A are slightly offset from one another for purposes of illustration, but that these may be more precisely coincident with one another in implementations of panoramic image generation system 200.

Figure 6B:
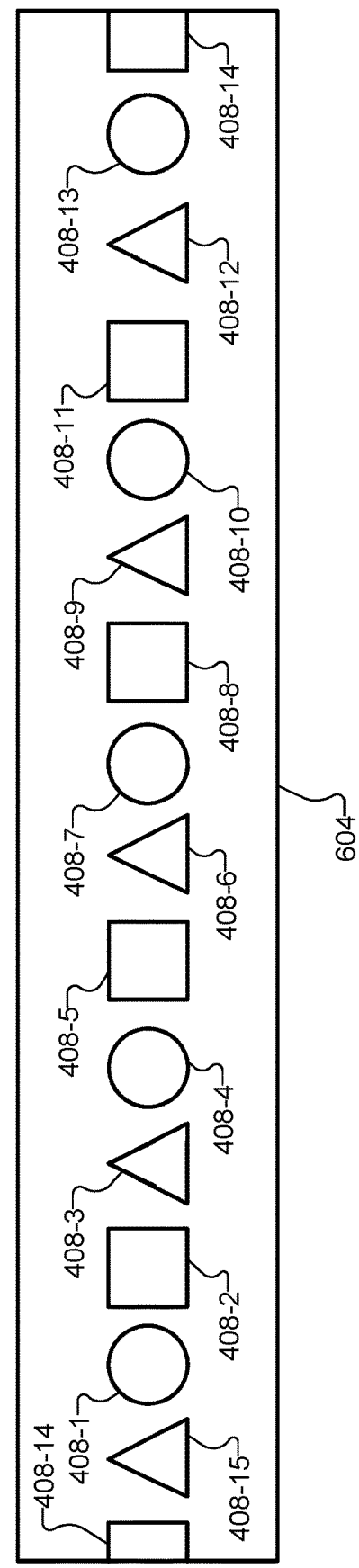
FIG. 6B illustrates an exemplary panoramic image generated based on the stitches of FIG. 6A according to principles described herein.

FIG. 6B illustrates a panoramic image 604 that results from each of stitches 602 being performed (i.e., the panoramic image generated based on stitches 602 of image segment set 502). As shown in FIG. 6B, each of shape objects 408-1 through 408-15 is depicted in panoramic image 604 so as to represent a full 360° view around the locus point at which capture device 202 is positioned. It will be understood that, when presented to a viewer, the left and right edges of panoramic image 604 may be joined so as to connect the two portions of shape object 408-14 and allow the viewer to turn in a complete circle and view any part of panoramic image 604 as the viewer may desire.

In order to define each of stitch lines 506 that allow for stitches 602 to be made and for panoramic image 604 to thereby be generated, a set of control points defining a relationship between each stitched pair of image segments must be identified. As used herein, a control point may refer to a pair of corresponding points or positions on two image segments that are to be stitched together. For instance, a control point may be represented as a first point (e.g., pixel, group of pixels, coordinate, etc.) of a first image segment, where that first point is coupled with a second point of a second image segment (e.g., an image segment that partially overlaps with the first image segment). Specifically, for example, if an image segment 1 is to be stitched to an image segment 2, a control point associated with this stitching may indicate that point $(x_1, y_1)$ in image segment 1 corresponds to point $(x_2, y_2)$ in image segment 2.

Typically, to identify control points for two image segments, a system (e.g., stitching system 101) may attempt to identify like features (e.g., readily identifiable pixel groups depicting corners and/or edges of objects, etc.) in both image segments. Specifically, if the image segments are partially overlapping, it should be the case that features in the overlapping portions of the image segments can be identified, recognized, and correlated for both image segments, thereby forming a control point for each correlated feature.

Returning to FIG. 5 to illustrate, a few exemplary features 504 of shape objects 408 (i.e., corners and edges demarcated with dark Xs) are depicted. It will be understood that various other features not explicitly labeled and called out in FIG. 5 may similarly be identified such that any suitable number of features for each image segment 502 may be identified. Based on features 504, a plurality of control points may be identified and, based on the set of control points, each of stitch lines 506 may be defined. As one example, for instance, a particular feature 504-1 of shape object 408-3 as depicted in image segment 502-T1 may be determined to correlate with or correspond to a particular feature 504-2 of shape object 408-3 as depicted in image segment 502-T2. As such, one exemplary control point for the stitching of image segment 502-T1 to image segment 502-T2 (i.e., for stitch 602-1-2 associated with stitch line 506-1-2) may be based on the respective coordinates of features 504-1 and 504-2. Various other control points may also be identified in a similar way for the stitching between image segments 502-T1 and 502-T2 to form a control point subset for that stitch (i.e., for stitch 602-1-2). Additionally, similar subsets of control points may be identified in like manner for each of the other stitches (e.g., stitches 602-4-1, 602-2-3, and 602-3-4) that are to be performed. Consequently, a full set of control points may include four subsets of control points, each subset including a plurality of control points for one particular stitch 602 of two image segments.

As described above, stitching attempts may fail when a suitable number of high-quality (e.g., accurate, precise, etc.) control points cannot be identified. For example, this situation may occur when content being depicted in the image segments does not have sufficient features that stitching system 101 is able to recognize and correlate with corresponding features of overlapping image segments. Consequently, as described above, recovery system 100 may be configured to identify revised and enhanced sets of control points for locus points where a stitch attempt has failed. Recovery system 100 may identify these control points in any suitable manner and based on control points identified in relation to any other locus points as may serve a particular implementation.

For example, returning to FIG. 3 to illustrate, it will be assumed for purposes of illustration that verification system 204 has determined that an attempt to generate a panoramic image based on an image segment set captured at locus point 304-23 has failed. Additionally, it will be assumed that verification system 204 has determined that panoramic images based on image segment sets captured at all the other locus points specifically mentioned below have been successful. As such, recovery system 100 may be tasked with identifying a revised set of control points based upon which a panoramic image for locus point 304-23 may be successfully generated. To identify this revised set of control points, recovery system 100 may examine control points associated with related locus points for which a panoramic image has been successfully generated, as well as, in certain examples, control points originally identified for locus point 304-23 itself (e.g., assuming that some, but not necessarily all, of the original control points determined for locus point 304-23 are insufficiently reliable).

A first panoramic image that has been unsuccessfully generated may depict target location 300 from a first locus point (e.g., locus point 304-23) that is different from a particular locus point at which a second panoramic image has been successfully generated. For clarity of description, the first locus point may be referred to herein as a "failed locus point" to suggest that the first panoramic image that stitching system 101 attempted to generate based on an image segment set captured at the locus point failed during the stitch attempt (e.g., due to insufficiently reliable control points). Similarly, the particular locus point at which the second panoramic image has been successfully generated may be referred to herein as a "successful locus point" to suggest that the second panoramic image that stitching system 101 generated based on an image segment set captured at the locus point was successful (e.g., due to having sufficiently reliable control points).

Recovery system 100 may be configured to identify a successful locus point in any suitable way. For example, the successful locus point may be any locus point 304 that is related to the failed locus point (i.e., locus point 304-23) in time, space, or any other suitable manner as may serve a particular implementation.

As one specific example, the identifying of the successful locus point at which the second panoramic image has been successfully generated may include determining that the successful locus point is in close spatial proximity to the failed locus point. Referring to the spatial positioning of locus points 304 shown in FIG. 3, a successful locus point 304 identified for failed locus point 304-23 may be any of the spatially proximate locus points shown near locus point 304-23 such as locus points 304-24, 304-13, or 304-12. Due to the spatial proximity to locus point 304-23, any or all of these successful locus points may have control points that may be relevant to failed locus point 304-23. For example, image segments captured at these spatially proximate successful locus points may depict similar or identical features as depicted in image segments captured at failed locus point 304-23, may be likely to be associated with similar camera settings due to having similar lighting in the proximate areas, or the like. If it is assumed that respective image segment sets for each locus point 304 are captured in the order indicated (i.e., starting with capturing an image segment set for locus point 304-1 and finishing with capturing an image segment set for locus point 304-30), it is noted that certain spatially proximate locus points 304 (e.g., locus point 304-24) may also happen to be temporally related to failed locus point 304-23 in some way, while other spatially proximate locus points 304 (e.g., locus points 304-12 and 304-13) may not be temporally related to failed locus point 304-23 in the same way or may not have such a close temporal relationship. Specifically, as indicated by the reference numbers in this example, the image segment set for locus point 304-24 was captured directly after the image segment set for locus point 304-23, while the image segment sets for locus points 304-12 and 304-13 were captured a relatively long time before the image segment set for locus point 304-23.

As another specific example, the identifying of the successful locus point at which the second panoramic image has been successfully generated may include determining that image segments used to successfully generate the second panoramic image depicting target location 300 from the successful locus point were captured in close temporal proximity (or with some other particular temporal relationship) to image segments used in the failed attempt to generate the first panoramic image depicting target location 300 from the failed locus point. For example, referring to the indicated temporal order of locus points 304-1 through 304-30 in FIG. 3, a successful locus point 304 identified for failed locus point 304-23 may be any of the temporally proximate locus points for which image segments are captured temporally proximate to locus point 304-23 such as locus points 304-22 or 304-24 or the like. In other examples, the relevant temporal relationship for identifying successful locus points may be defined in terms of sequence or order, rather than proximity. For instance, in an implementation in which successful locus points are identified dynamically as images are being captured, a successful locus point may be identified as temporally relevant if processed prior to the failed locus point (or with some other such predefined temporal relationship) even if the successful locus point is not particularly temporally proximate to the failed locus point (e.g., not directly before the failed locus point in the sequence).

Any or all of the successful locus points that have temporally relevant relationships with failed locus point 304-23 (e.g., temporally proximate locus points 304-22 and 304-24) may also have control points that are relevant to failed locus point 304-23. For example, image segments captured at these temporally proximate successful locus points may be captured at approximately the same time of day as image segments captured at failed locus point 304-23 (e.g., thereby making it likely that the lighting depicted in the image segments will be similar) and without camera settings being changed to adapt to other characteristics (e.g., lighting characteristics) at other areas of target location 300, or the like. As similarly noted above in relation to the spatially proximate locus points 304, it is noted that certain temporally proximate locus points 304 such as locus point 304-24 may also be spatially proximate to failed locus point 304-23, while other temporally proximate locus points 304 such as locus point 304-22 may not be particularly spatially proximate to failed locus point 304-23.

In some examples, recovery system 100 may identify, as the successful locus points upon which revised control points are to be based for a failed locus point, one or more spatially proximate locus points, one or more temporally proximate locus points, and/or a combination of both spatially proximate and temporally proximate locus points 304. Specifically, in response to detecting an image stitching failure associated with a first locus point (e.g., locus point 304-23), recovery system 100 may identify at least two successful locus points: 1) a second locus point 304 at which a second panoramic image within the target location image set for target location 300 has been successfully generated, and 2) a third locus point 304 at which a third panoramic image within target location image set for target location 300 has been successfully generated. In these examples, the identifying of the second locus point at which the second panoramic image has been successfully generated may comprise determining that the second locus point is in close spatial proximity to the first locus point, and the identifying of the third locus point at which the third panoramic image has been successfully generated may comprise determining that image segments used to successfully generate the third panoramic image were captured in close temporal proximity to image segments used in the failed attempt to generate the first panoramic image. In some examples, multiple locus points in each of these categories may be identified. For instance, referring to the example of failed locus point 304-23, successful locus points 304-12 and 304-13 may be identified as spatially proximate locus points, locus point 304-22 may be identified as a temporally proximate locus point, and locus point 304-24 may be identified as both a spatially proximate and a temporally proximate locus point.

Once one or more successful locus points related to a failed locus point have been identified, recovery system 100 may identify, based on control points that were used by stitching system 101 to successfully generate the respective panoramic images at the successful locus points, a revised set of control points based upon which a panoramic image for the failed locus point is to be successfully generated. For example, once successful locus points 304-12, 304-13, 304-22, and 304-24 have been identified as relating to failed locus point 304-23, recovery system 100 may identify a revised set of control points for locus point 304-23 based on the respective sets of control points used to successfully generate the respective panoramic images associated with locus points 304-12, 304-13, 304-22, and/or 304-24. Additionally, as will be described in more detail below, in some examples, the revised set of control points for locus point 304-23 may further be based on the control points originally identified for locus point 304-23 (i.e. the control points for locus point 304-23 that previously led to the failed stitch attempt).

Figure 7:
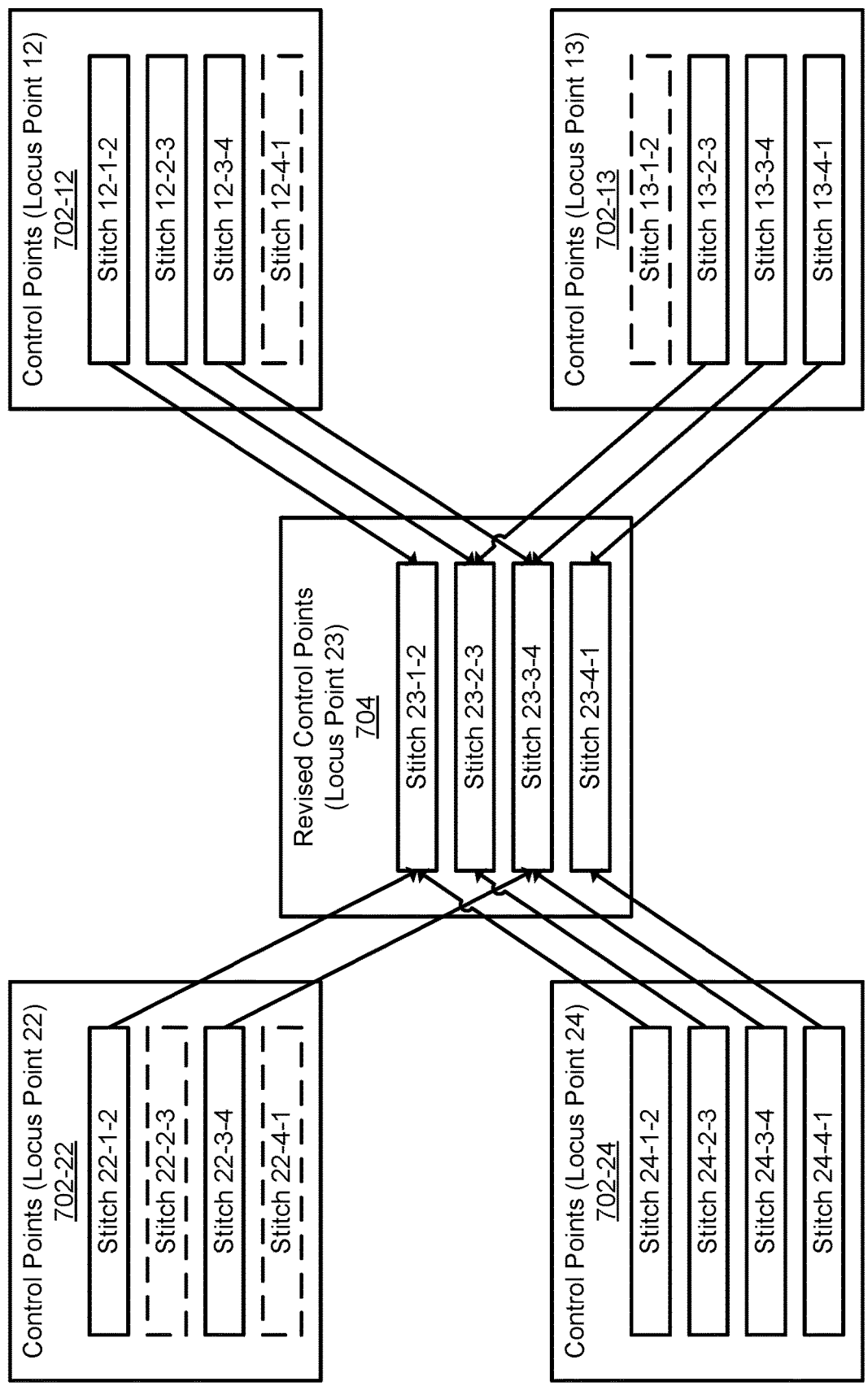
FIGS. 7 and 8 illustrate how various sets of control points may be used to generate and enhance a revised set of control points to be used to successfully generate a panoramic image after a previous attempt to generate the panoramic image failed according to principles described herein.
Figure 8:
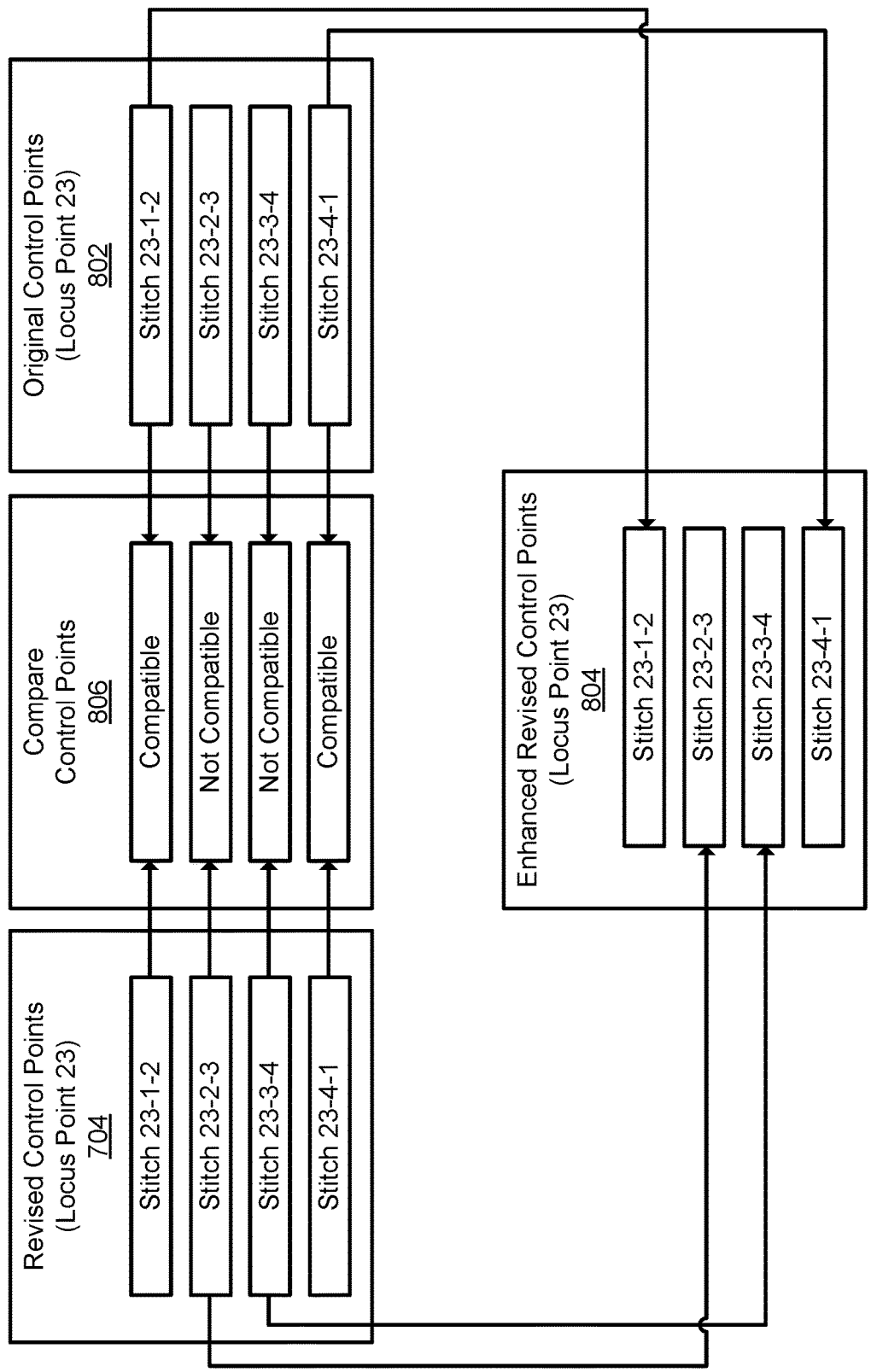

To illustrate, FIGS. 7 and 8 show how various sets of control points may be used to generate and enhance a revised set of control points to be used to successfully generate a panoramic image after a previous attempt to generate the panoramic image has failed. More specifically, FIG. 7 illustrates how control points associated with successful locus points may be processed and combined to generate the set of revised control points, and FIG. 8 then illustrates how the revised set of control points generated in FIG. 7 may, in certain implementations, be enhanced based on an original set of control points used in the failed attempt to stitch together the panoramic image.

Continuing with the example of failed locus point 304-23 and related successful locus points 304-12, 304-13, 304-22, and 304-24 that was described above, FIG. 7 shows respective control point sets 702 associated with each of the successful locus points related to failed locus point 304-23. Specifically, as shown, a control point set 702-22 includes a set of control points used to successfully generate the panoramic image associated with locus point 304-22 ("Locus Point 22"), a control point set 702-12 includes a set of control points used to successfully generate the panoramic image associated with locus point 304-12 ("Locus Point 12"), a control point set 702-24 includes a set of control points used to successfully generate the panoramic image associated with locus point 304-24 ("Locus Point 24"), and a control point set 702-13 includes a set of control points used to successfully generate the panoramic image associated with locus point 304-13 ("Locus Point 13"). FIG. 7 further shows a revised control point set 704 that is based on control point sets 702 and includes control points that are to be used to successfully generate a panoramic image associated with locus point 304-23 ("Locus Point 23"), which, as described above, is assumed in this example to have failed during a previous stitch attempt.

As shown in each of control point sets 702 and 704, a set of control points may include respective subsets of control points associated with each stitch of one image segment to another. For example, control points included within control point set 702-22 may be separated into four subsets labeled stitch 22-1-2 (i.e., control points used for the stitch of a first to a second image segment, analogous to stitch 602-1-2 described above), stitch 22-2-3 (i.e., control points used for the stitch of the second to a third image segment, analogous to stitch 602-2-3 described above), stitch 22-3-4 (i.e., control points used for the stitch of the third to a fourth image segment, analogous to stitch 602-3-4 described above), and stitch 22-4-1 (i.e., control points used for the stitch of the fourth to the first image segment, analogous to stitch 602-4-1 described above). Other control point sets 702 and revised control point set 704 may include similar subsets for each of their respective stitches, as shown.

Recovery system 100 may identify revised control point set 704 based on each of control point sets 702 by performing any suitable analysis and operations with respect to control point sets 702. For example, recovery system 100 may assign, to each of the control points in each of control point sets 702, a respective confidence value representative of a likelihood that the control point will be compatible with control point set 704 (i.e., a set of control points configured to lead to a successful generation of the panoramic image that previously failed to be properly stitched due to inadequate original control points). Based on the respective confidence values assigned to each of the control points, recovery system 100 may then filter each of control point sets 702 by 1) maintaining within the control point sets 702 a plurality of control points assigned to have respective confidence values that satisfy a predetermined confidence threshold, and 2) removing from the control point sets a plurality of control points assigned to have respective confidence values that fail to satisfy the predetermined confidence threshold. After such filtering of control points 702, all of the control points still maintained within control point sets 702 (i.e., all the control points that have not been removed) will be sufficiently compatible with one another to satisfy the predetermined confidence threshold. As such, these control points may be included within revised control point set 704 or may otherwise be used as a basis for the identification of control points included in revised control point set 704.

As used herein, control points may be said to be "compatible with" other control points (or with a set of control points) when all the control points are in agreement, are correlated with one another, and/or otherwise tend to cause an image stitching system (e.g., stitching system 101) to perform the same or a similar stitch in the same or a similar way. It will be understood that compatible control points may not necessarily be identical or similar control points (e.g., control points that would join one particular feature or pixel group of one image segment to another particular feature or pixel group of another image segment). However, while compatible control points may be distinct from one another, they may still converge on directing the image stitching system to generate a particular stitch along a particular stitch line in a particular way. For example, a first control point may tie together a feature at a top right area of a first image segment and a feature at a top left area of a second image segment, while a second control point may tie together a feature at a bottom right area of the first image segment and a feature at a bottom left area of the second image segment. While these exemplary control points do not directly align with one another (i.e., because the first control point is toward the top of the image segments and the second control point is toward the bottom of the image segments), the two control points may be compatible with one another if they both help define the same stitch line or allow for the same stitch line to be used to stitch together the first and second image segments.

While control points may generally be identified based on an analysis of image segment content, such as, for example, by identifying corresponding features depicted in two image segments in the manner described above, another manner of identifying control points may be useful or necessary when image segment content is featureless or feature sparse. In these examples, control points may be identified with less reliance or without reliance on feature analysis. Rather, such control points may be identified based partially or entirely on control point compatibility analyses and/or control point averaging of other relevant control points from related locus points (e.g., control points from locus points 304-12, 304-13, 304-22, and/or 304-24 in the example of failed locus point 304-23).

FIG. 7 illustrates how control points from control point sets 702 of successful locus points spatially and/or temporally related to locus point 304-23 may be combined and used to identify revised control point set 704 for locus point 304-23. Revised control point set 704 will be understood to be generated based on the compatibility of control points from control point sets 702 with one another rather than or in addition to being based on control points identified based on feature analysis of image segments captured at locus point 704-23. For example, control points for stitch 23-1-2 may be identified based solely on control points used for stitches 12-1-2, 22-1-2, and 24-1-2. In some examples, all of the control points used for these stitches may be compatible with one another such that all are included as control points for stitch 23-1-2, and stitch 23-1-2 will be based on a much greater number of control points than any of stitches 12-1-2, 22-1-2 or 24-1-2. In other examples, because there may be such a large number of control points upon which the control points of stitch 23-1-2 may be based, recovery system 100 may increase the predetermined confidence threshold to require a greater level of compatibility for each control point that is to be maintained in the final revised control point set. In these examples, only some of the control points used for each stitch 12-1-2, 22-1-2 and 24-1-2 may be used as a basis for identifying revised control points for stitch 23-1-2. Additionally, as shown, recovery system 100 may determine that the control points for stitch 13-1-2 of control point set 702-13 are not particularly compatible with the other control points for the corresponding 1-2 stitch from the other control point sets 702. As such, FIG. 7 illustrates that control points from stitch 13-1-2 may not be used in the identification of revised control point set 704 at all (i.e., indicated by the depiction of stitch 13-1-2 using dashed lines rather than solid lines and by the absence of an arrow extending from stitch 13-1-2 to stitch 23-1-2).

Other control points from control point sets 702 may similarly be combined (e.g., as a similar compatibility confidence analysis dictates) to identify control points for each of the other stitches 23-2-3, 23-3-4, and 23-4-1 in revised control point set 704 for locus point 304-23. Specifically, as shown, control points for stitch 23-2-3 may be identified based on compatible control points from stitch 12-2-3 of control point set 702-12, stitch 13-2-3 of control point set 702-13, and stitch 24-2-3 of control point set 702-24. Control points for stitch 23-3-4 may be identified based on compatible control points from stitch 12-3-4 of control point set 702-12, stitch 13-3-4 of control point set 702-13, stitch 22-3-4 of control point set 702-22, and stitch 24-3-4 of control point set 702-24. Control points for stitch 23-4-1 may be identified based on compatible control points from stitch 13-4-1 of control point set 702-13 and stitch 24-4-1 of control point set 702-24. The control points and compatibility analyses described above will be understood to be exemplary only and it will be understood that any suitable control points used for any suitable locus point (including control points from only a single successful locus point rather than a plurality of successful locus points as shown in FIG. 7) may be used as a basis for revised control points as may serve a particular implementation.

As mentioned above, revised control points included within revised control point set 704 may be generated in certain examples based exclusively on control points that have been identified in connection with separate, successful locus points related to failed locus point 304-23. As such, all of the control points included in revised control point 704 may ultimately be based on features depicted in image segments captured from locus points other than locus point 304-23. If all of the image segments captured at locus point 304-23 happen to be devoid of suitable features such that few if any reliable control points can be identified from the content of these image segments, then the compatibility-based control points in revised control point 704 may be an appropriate option for reattempting to generate a panoramic image based on the image segments captured at locus point 304-23.

However, it may also be the case in certain examples that fewer than all of the image segments captured at locus point 304-23 are devoid of suitable features, and, accordingly, that at least one of the image segments has suitable features for identifying reliable control points. In these examples, the control points that are based on the features depicted in image segments captured at locus point 304-23 may be more accurate, reliable, and likely to result in a successfully stitched panoramic image than may be the compatibility-based control points in revised control point set 704 (i.e., the control points identified from control point sets 702). Accordingly, in certain implementations, recovery system 100 may be configured to attempt to enhance revised control point set 704 based on original control points identified for failed locus point 304-23 (e.g., control points identified based on features depicted in image segments captured at locus point 304-23). More particularly, recovery system 100 may perform the identifying of the set of control points based upon which a panoramic image is to be successfully generated further based on the original set of control points that were used by stitching system 101 in the failed attempt to generate the panoramic image.

To illustrate, FIG. 8 shows revised control point set 704 (which, as described above, is generated exclusively based on control points identified based on features depicted in image segments captured at locus points other than failed locus point 304-23) along with an original control point set 802 and an enhanced revised control point set 804. As shown, each of the control point sets illustrated in FIG. 8 include different subsets of control points for stitches 23-1-2, 23-2-3, 23-3-4, and 23-4-1. However, because control points in original control point set 802 are identified based on features captured at locus point 304-23 and control points in revised control point set 704 are ultimately identified based on features captured at locus points other than locus point 304-23, it will be understood that the control points in each of the subsets may be distinct from one another and may or may not be compatible with one another. If the control points included within corresponding control point subsets (i.e., the control points for a particular stitch) are compatible with one another at least to a degree that a predetermined confidence threshold is satisfied, recovery system 100 may be configured to assume that suitable features are depicted in the image segments captured at locus point 304-23. As such, the original control points may be selected in these cases instead of the revised control points identified for revised control point set 704. Conversely, if the control points included within corresponding control point subsets are not compatible with one another at least to a degree that satisfies the predetermined confidence threshold, recovery system 100 may be configured to assume that the relevant image segments for that stitch lack suitable features from which reliable control points may be identified (i.e., recovery system 100 may determine that the original control points for this particular stitch are among the unreliable control points that caused the stitch attempt to fail). As such, in these cases, the revised control points identified in revised control point set 704 may be selected instead of the original control points included within original control point set 802.

To illustrate this comparison and selection process, FIG. 8 shows a control point comparison operation 806 that may determine, for each pair of control point subsets (e.g., for the control points subsets associated with each of stitches 23-1-2, 23-2-3, 23-3-4, and 23-4-1), whether the revised control points are compatible with the original control points at least to a degree that a predetermined confidence threshold is satisfied. In some examples, this predetermined confidence threshold may be the same as the threshold described above in relation to the identification of revised control point set 704, while, in other examples, this predetermined confidence threshold may be distinct from the threshold described above. Based on whether the corresponding control point subsets are compatible, enhanced revised control point set 804 may select the enhanced or the original control point subset, as illustrated by the arrows (or lack thereof) leading to the control point subsets in enhanced revised control point set 804. Specifically, as shown, because the control point subsets for stitches 23-1-2 and 23-4-1 are both determined by operation 806 to be compatible, the control point subsets for stitches 23-1-2 and 23-4-1 selected for enhanced revised control point set 804 may be the corresponding control point subsets identified in original control point set 802. In contrast, as further shown, because the control point subsets for stitches 23-2-3 and 23-3-4 are both determined by operation 806 to be incompatible with one another, the control point subsets for stitches 23-2-3 and 23-3-4 selected for enhanced revised control point set 804 may be the corresponding control point subsets identified in revised control point set 704.

Figure 9:
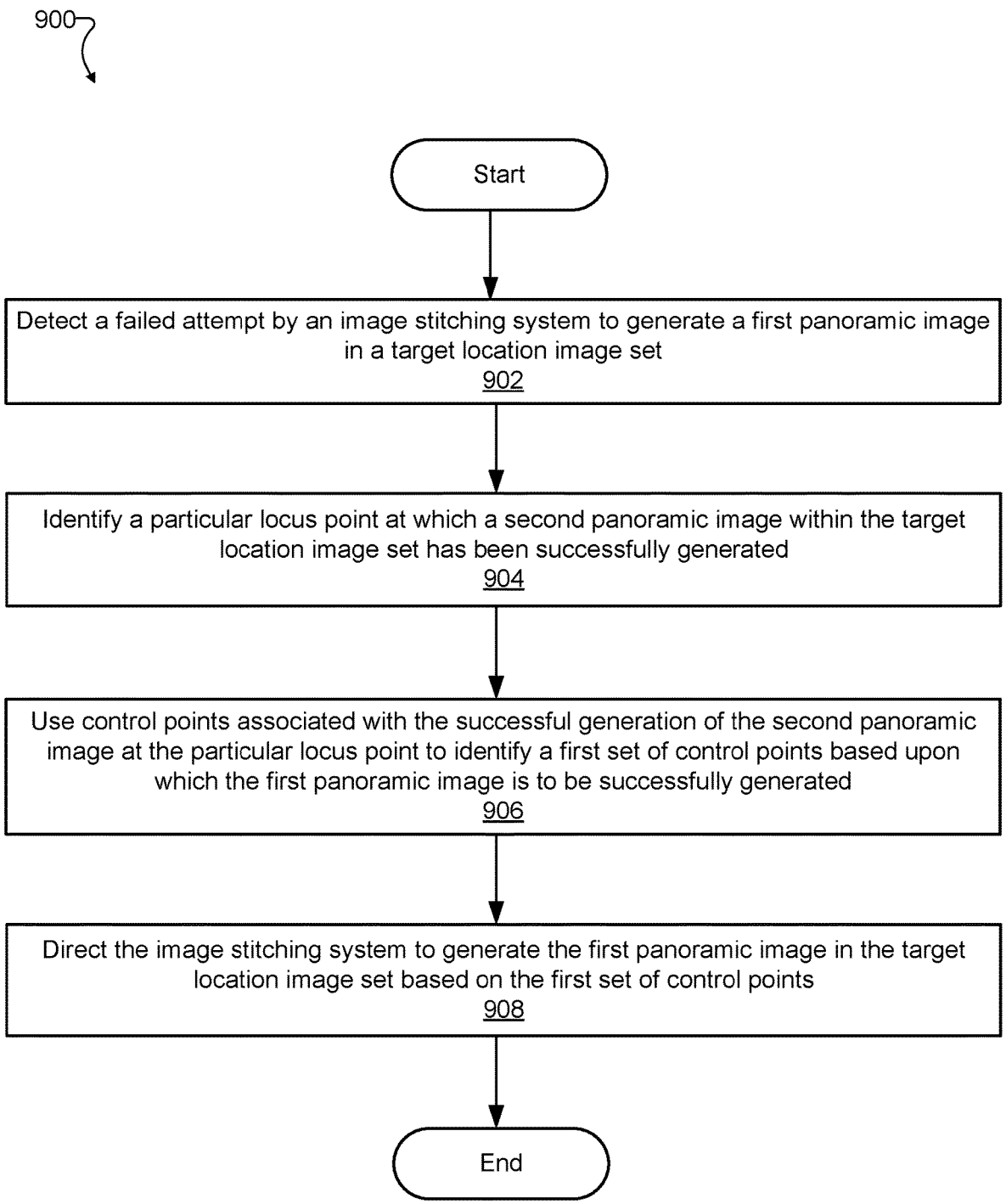
FIG. 9 illustrates an exemplary method for automatic image stitching failure recovery according to principles described herein.

FIG. 9 illustrates an exemplary image stitching recovery method 900 for automatic image stitching failure recovery. While FIG. 9 illustrates exemplary operations according to one embodiment, other embodiments may omit, add to, reorder, and/or modify any of the operations shown in FIG. 9. One or more of the operations shown in FIG. 9 may be performed by an image stitching recovery system such as recovery system 100, any components included therein, and/or any implementation thereof. In certain implementations, an image stitching recovery system performing method 900 may be associated with an image stitching system such as image stitching system 101 or another suitable image stitching system.

In operation 902, an image stitching recovery system associated with an image stitching system may detect a failed attempt by the image stitching system to generate a first panoramic image in a target location image set. For example, the target location image set may include a plurality of panoramic images each depicting a target location from a different respective locus point at the target location. Operation 902 may be performed in any of the ways described herein.

In operation 904, the image stitching recovery system may identify a particular locus point at which second panoramic image within the target location image set has been successfully generated. For example, the image stitching recovery system may identify the particular locus point in response to the detecting of the image stitching failure in operation 902. Operation 904 may be performed in any of the ways described herein.

In operation 906, the image stitching recovery system may identify a first set of control points based upon which the first panoramic image is to be successfully generated. For instance, the identifying of the first set of control points may be based on a second set of control points that were used by the image stitching system to successfully generate the second panoramic image at the particular locus point identified in operation 904. Operation 906 may be performed in any of the ways described herein.

In operation 908, the image stitching recovery system may direct the image stitching system to generate the first panoramic image in the target location image set. For example, the image stitching recovery system may direct the generating of the first panoramic image based on the first set of control points identified in operation 906. Operation 908 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 10:
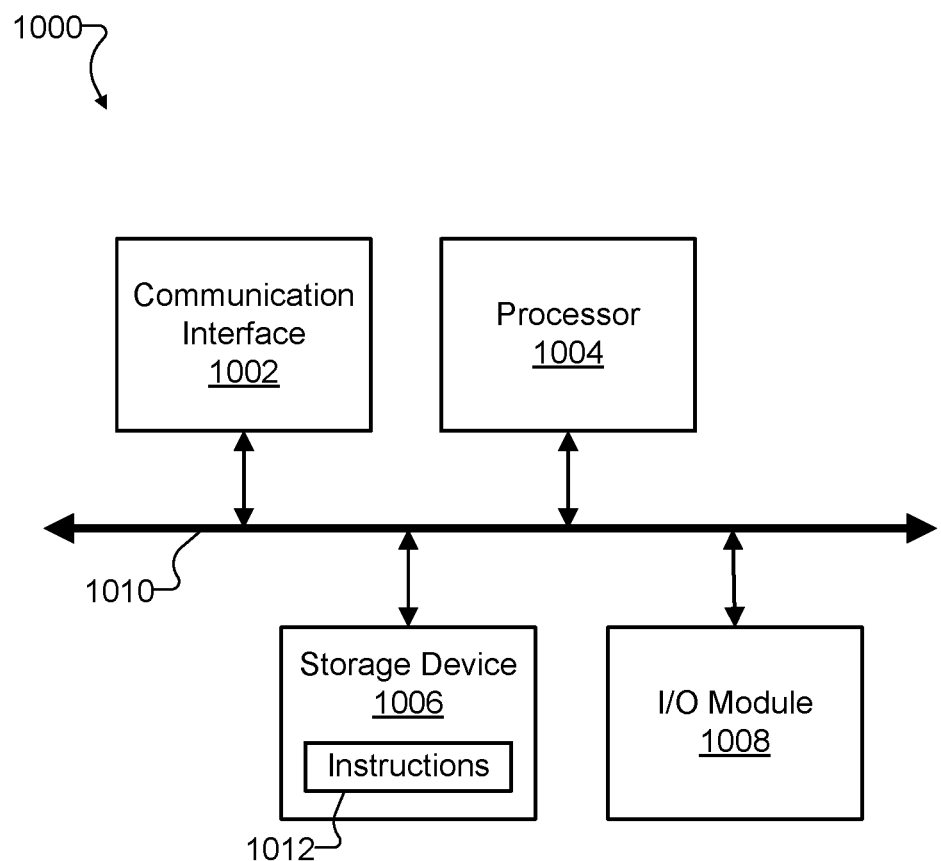
FIG. 10 illustrates an exemplary computing device according to principles described herein.

FIG. 10 illustrates an exemplary computing device 1000 that may be specifically configured to perform one or more of the processes described herein. As shown in FIG. 10, computing device 1000 may include a communication interface 1002, a processor 1004, a storage device 1006, and an input/output ("I/O") module 1008 communicatively connected one to another via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data and/or interpreting, executing, and/or directing execution of one or more of the instructions, processes, and/or operations described herein. Processor 1004 may perform operations by executing computer-executable instructions 1012 (e.g., an application, software, code, and/or other executable data instance) stored in storage device 1006.

Storage device 1006 may include one or more data storage media, devices, or configurations and may employ any type, form, and combination of data storage media and/or device. For example, storage device 1006 may include, but is not limited to, any combination of the non-volatile media and/or volatile media described herein. Electronic data, including data described herein, may be temporarily and/or permanently stored in storage device 1006. For example, data representative of computer-executable instructions 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1000. For example, storage facility 102 of recovery system 100 may be implemented by storage device 1006. Likewise, processing facility 104 of recovery system 100 may be implemented by processor 1004.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by an image stitching recovery system associated with an image stitching system, a failed attempt by the image stitching system to generate a first panoramic image in a target location image set, the target location image set including a plurality of panoramic images each depicting a target location from a different respective locus point at the target location;
   identifying, by the image stitching recovery system in response to the detecting of the image stitching failure, a particular locus point at which a second panoramic image within the target location image set has been successfully generated;
   identifying, by the image stitching recovery system, a first set of control points based upon which the first panoramic image is to be successfully generated, the identifying of the first set of control points based on a second set of control points that were used by the image stitching system to successfully generate the second panoramic image at the particular locus point; and
   directing, by the image stitching recovery system, the image stitching system to generate, based on the first set of control points, the first panoramic image in the target location image set.

2. The method of claim 1, further comprising: autonomously determining, by the image stitching recovery system, that each image segment of an image segment set used by the image stitching system in the failed attempt to generate the first panoramic image satisfies a predetermined image quality threshold; and
   wherein the directing of the image stitching system to generate the first panoramic image comprises automatically directing, in response to the autonomous determining that each image segment of the image segment set satisfies the predetermined image quality threshold, the image stitching system to reattempt to generate the first panoramic image based on the image segment set previously used by the image stitching system in the failed attempt to generate the first panoramic image.

3. The method of claim 1, wherein:
   the first panoramic image depicts the target location from a first locus point that is different from the particular locus point at which the second panoramic image has been successfully generated; and
   the identifying of the first set of control points based on the second set of control points comprises:
      assigning, to each of the control points in the second set of control points, a respective confidence value representative of a likelihood that the control point will be compatible with a set of control points that leads to a successful generation of the first panoramic image, and
      filtering the second set of control points based on the respective confidence values assigned to each of the control points by
         maintaining within the second set of control points a plurality of control points assigned to have respective confidence values that satisfy a predetermined confidence threshold, and
         removing from the second set of control points a plurality of control points assigned to have respective confidence values that fail to satisfy the predetermined confidence threshold.

4. The method of claim 1, wherein the identifying of the first set of control points is further based on a third set of control points that were used by the image stitching system in the failed attempt to generate the first panoramic image.

5. The method of claim 1, wherein:
the first panoramic image depicts the target location from a first locus point that is different from the particular locus point at which the second panoramic image has been successfully generated; and
the identifying of the particular locus point at which the second panoramic image has been successfully generated comprises determining that the particular locus point is in close spatial proximity to the first locus point.

6. The method of claim 1, wherein:
the first panoramic image depicts the target location from a first locus point that is different from the particular locus point at which the second panoramic image has been successfully generated; and
the identifying of the particular locus point at which the second panoramic image has been successfully generated comprises determining that image segments used to successfully generate the second panoramic image depicting the target location from the particular locus point were captured in close temporal proximity to image segments used in the failed attempt to generate the first panoramic image depicting the target location from the first locus point.

7. The method of claim 1, further comprising identifying, by the image stitching recovery system in response to the detecting of the image stitching failure, an additional particular locus point at which a third panoramic image within the target location image set has been successfully generated;
wherein:
the first panoramic image depicts the target location from a first locus point that is different from both the particular locus point and the additional particular locus point,
the identifying of the particular locus point at which the second panoramic image has been successfully generated comprises determining that the particular locus point is in close spatial proximity to the first locus point, and
the identifying of the additional particular locus point at which the third panoramic image has been successfully generated comprises determining that image segments used to successfully generate the third panoramic image depicting the target location from the additional particular locus point were captured in close temporal proximity to image segments used in the failed attempt to generate the first panoramic image depicting the target location from the first locus point.

8. The method of claim 1, further comprising:
detecting, by the image stitching recovery system in response to the directing, that the generation of the first panoramic image based on the first set of control points represents an additional failed attempt to generate the first panoramic image; and
providing, by the image stitching recovery system in response to the detecting that the generation of the first panoramic image represents the additional failed attempt, an alert that indicates to a user that the additional failed attempt has occurred.

9. An image stitching recovery system comprising:
a memory storing instructions; and
a processor communicatively coupled to the memory and configured to execute the instructions to:
detect a failed attempt by an image stitching system to generate a first panoramic image in a target location image set, the target location image set including a plurality of panoramic images each depicting a target location from a different respective locus point at the target location,
identify, in response to the detecting of the image stitching failure, a particular locus point at which a second panoramic image within the target location image set has been successfully generated,
identify a first set of control points based upon which the first panoramic image is to be successfully generated, the identifying of the first set of control points based on a second set of control points that were used by the image stitching system to successfully generate the second panoramic image at the particular locus point, and
direct the image stitching system to generate, based on the first set of control points, the first panoramic image in the target location image set.

10. The image stitching recovery system of claim 9, wherein:
the processor is further configured to execute the instructions to autonomously determine that each image segment of an image segment set used by the image stitching system in the failed attempt to generate the first panoramic image satisfies a predetermined image quality threshold; and
the directing of the image stitching system to generate the first panoramic image comprises automatically directing, in response to the autonomous determining that each image segment of the image segment set satisfies the predetermined image quality threshold, the image stitching system to reattempt to generate the first panoramic image based on the image segment set used by the image stitching system in the failed attempt to generate the first panoramic image.

11. The image stitching recovery system of claim 9, wherein:
the first panoramic image depicts the target location from a first locus point that is different from the particular locus point at which the second panoramic image has been successfully generated; and
the identifying of the first set of control points based on the second set of control points comprises:
assigning, to each of the control points in the second set of control points, a respective confidence value representative of a likelihood that the control point will be compatible with a set of control points that leads to a successful generation of the first panoramic image, and
filtering the second set of control points based on the respective confidence values assigned to each of the control points by
maintaining within the second set of control points a plurality of control points assigned to have respective confidence values that satisfy a predetermined confidence threshold, and
removing from the second set of control points a plurality of control points assigned to have respective confidence values that fail to satisfy the predetermined confidence threshold.

12. The image stitching recovery system of claim 9, wherein the identifying of the first set of control points is further based on a third set of control points that were used by the image stitching system in the failed attempt to generate the first panoramic image.

13. The image stitching recovery system of claim 9, wherein:

the first panoramic image depicts the target location from a first locus point that is different from the particular locus point at which the second panoramic image has been successfully generated; and the identifying of the particular locus point at which the second panoramic image has been successfully generated comprises determining that the particular locus point is in close spatial proximity to the first locus point.

14. The image stitching recovery system of claim 9, wherein:

the first panoramic image depicts the target location from a first locus point that is different from the particular locus point at which the second panoramic image has been successfully generated; and the identifying of the particular locus point at which the second panoramic image has been successfully generated comprises determining that image segments used to successfully generate the second panoramic image depicting the target location from the particular locus point were captured in close temporal proximity to image segments used in the failed attempt to generate the first panoramic image depicting the target location from the first locus point.

15. The image stitching recovery system of claim 9, wherein:

the processor is further configured to execute the instructions to identify, in response to the detecting of the image stitching failure, an additional particular locus point at which a third panoramic image within the target location image set has been successfully generated;

the first panoramic image depicts the target location from a first locus point that is different from both the particular locus point and the additional particular locus point;

the identifying of the particular locus point at which the second panoramic image has been successfully generated comprises determining that the particular locus point is in close spatial proximity to the first locus point; and the identifying of the additional particular locus point at which the third panoramic image has been successfully generated comprises determining that image segments used to successfully generate the third panoramic image depicting the target location from the additional particular locus point were captured in close temporal proximity to image segments used in the failed attempt to generate the first panoramic image depicting the target location from the first locus point.

16. The image stitching recovery system of claim 9, wherein the processor is further configured to execute the instructions to:

detect, in response to the directing, that the generation of the first panoramic image based on the first set of control points represents an additional failed attempt to generate the first panoramic image; and provide, in response to the detecting that the generation of the first panoramic image represents the additional failed attempt, an alert that indicates to a user that the additional failed attempt has occurred.

17. A non-transitory computer-readable medium storing instructions that, when executed, direct a processor of an image stitching recovery system to:

detect a failed attempt by an image stitching system to generate a first panoramic image in a target location image set, the target location image set including a plurality of panoramic images each depicting a target location from a different respective locus point at the target location;

identify, in response to the detecting of the image stitching failure, a particular locus point at which a second panoramic image within the target location image set has been successfully generated;

identify a first set of control points based upon which the first panoramic image is to be successfully generated, the identifying of the first set of control points based on a second set of control points that were used by the image stitching system to successfully generate the second panoramic image at the particular locus point; and direct the image stitching system to generate, based on the first set of control points, the first panoramic image in the target location image set.

18. The non-transitory computer-readable medium of claim 17, wherein:

the instructions further direct the processor to autonomously determine that each image segment of an image segment set used by the image stitching system in the failed attempt to generate the first panoramic image satisfies a predetermined image quality threshold; and the directing of the image stitching system to generate the first panoramic image comprises automatically directing, in response to the autonomous determining that each image segment of the image segment set satisfies the predetermined image quality threshold, the image stitching system to reattempt to generate the first panoramic image based on the image segment set used by the image stitching system in the failed attempt to generate the first panoramic image.

19. The non-transitory computer-readable medium of claim 17, wherein:

the first panoramic image depicts the target location from a first locus point that is different from the particular locus point at which the second panoramic image has been successfully generated; and the identifying of the first set of control points based on the second set of control points comprises:

assigning, to each of the control points in the second set of control points, a respective confidence value representative of a likelihood that the control point will be compatible with a set of control points that leads to a successful generation of the first panoramic image, and filtering the second set of control points based on the respective confidence values assigned to each of the control points by maintaining within the second set of control points a plurality of control points assigned to have respective confidence values that satisfy a predetermined confidence threshold, and removing from the second set of control points a plurality of control points assigned to have respective confidence values that fail to satisfy the predetermined confidence threshold.

20. The non-transitory computer-readable medium of claim 17, wherein the identifying of the first set of control points is further based on a third set of control points that were used by the image stitching system in the failed attempt to generate the first panoramic image.

* * * * *